United States Patent [19]

Stephenson

[11] Patent Number: 5,043,618

[45] Date of Patent: Aug. 27, 1991

[54] ELECTRIC MACHINES

[75] Inventor: John M. Stephenson, Leeds, England

[73] Assignee: Switched Reluctance Drives Ltd., Leeds, England

[21] Appl. No.: 357,356

[22] Filed: May 26, 1989

[30] Foreign Application Priority Data

May 27, 1988 [GB] United Kingdom ............... 8812692

[51] Int. Cl.<sup>5</sup> ............................................. H02K 19/24
[52] U.S. Cl. .................................. 310/168; 310/49 R; 310/179; 310/185; 310/216
[58] Field of Search ............. 310/269, 261, 254, 49 R, 310/162–164, 168–170, 180, 179, 184, 259, 185, 159, 216, 218; 318/701

[56] References Cited

U.S. PATENT DOCUMENTS

| 3,062,979 | 11/1962 | Jarret et al. | 310/168 |
| 3,643,118 | 0/1972 | Ichiki et al. | 310/40 |
| 3,978,356 | 8/1976 | Spiesberger | 310/162 |
| 3,978,358 | 0/1976 | Johnson et al. | 310/257 |
| 3,995,203 | 11/1976 | Török | 310/163 |
| 4,348,605 | 9/1982 | Török | 310/168 |
| 4,733,113 | 3/1988 | Smith | 310/49 R |
| 4,792,709 | 12/1988 | Smith et al. | 310/185 |

FOREIGN PATENT DOCUMENTS

| 0084198 | of 1983 | European Pat. Off. . | |
| 0175029 | 4/1961 | Sweden | 310/216 |
| 0109277 | 8/1917 | United Kingdom | 310/216 |
| 337097 | of 1930 | United Kingdom . | |
| 382602 | of 1932 | United Kingdom . | |
| 614104 | of 1948 | United Kingdom . | |
| 632293 | of 1949 | United Kingdom . | |

Primary Examiner—R. Skudy
Attorney, Agent, or Firm—Christensen, O'Connor, Johnson & Kindness

[57] ABSTRACT

An electric motor comprises a laminated stator core supporting windings to define similar adjacent poles. A rotor is mounted to rotate within the stator. The similar poles in a group define flux paths with adjacent pole groups. Thus the flux paths required are restricted to those between adjacent dissimilar pole groups. In this way the material of the core between the flux paths can be reduced as it is not required to carry flux itself. This redundant portion of the core can be shaped to accommodate neighbouring components or to reduce the material of the core laminations.

5 Claims, 1 Drawing Sheet

ELECTRIC MACHINES

BACKGROUND OF THE INVENTION

1. Field of the Invention

This invention relates to electric machines working as motors or generators. The invention is particularly applicable to reluctance motors.

2. Background Art

FIG. 1 of the drawings illustrates a known construction of single-phase salient pole switched reluctance machine which can be operated as either an electric motor or generator. However, for the sake of convenience the term motor will be used throughout this specification though it is to be understood that the invention is equally applicable to electric generators.

The switched reluctance motor of FIG. 1 comprises a stator core 1 and a rotor 2 which are both formed with four salient poles 3 and 4, respectively. The stator core is made up of numerous metal lateral laminations in a stack. Each salient stator pole 3 carries an exciting coil 5. The coils 5 are wound such that North (N) and South (S) poles are created alternately around the stator. As illustrated by the broken lines 6, each sector of the assembled laminations of the core 1 carries half the flux created in one of the associated adjacent stator poles.

In this kind of motor the laminations are usually stamped from a blank of strip metal. As the general outer shape of each lamination will be circular there will be a significant amount of material left between stampings of laminations which can only be cast aside as scrap metal. Although this scrap can, of course, be recycled, it is clearly desirable to utilise the strip with as little waste as possible.

Furthermore, each pole carries its own copper winding. This construction requires a considerable amount of copper which will add both to the weight and cost of the motor.

It is an object of the present invention to provide an electric machine which optimises the use of the core material and the copper windings in order to reduce the cost of manufacture.

According to the present invention there is provided an electric reluctance machine comprising a primary having a primary core defining primary poles; a secondary having secondary poles; and a coil or set of coils, the or each coil being connected and/or being located with respect to the primary poles so that the relative magnetic orientation of those poles in a group of adjacent primary poles with respect to the coil or coils is the same and the said orientation of the groups of primary poles is different in adjacent groups, wherein a portion of the primary core between adjacent primary poles in a group is relatively radially thinner than that between adjacent groups of primary poles.

Thus, there is substantially no flux between poles of like polarity and this lack of flux allows the material of the core between like poles to be reduced accordingly.

The terms primary and secondary are used to denote the relatively moving parts of the machine. Clearly, the poles associated with the coil or coils could be the rotor or stator of the machine.

In this way the flux through the core between the groups of stator poles is increased by an amount related to the number of stator poles in a group. Also, the flux in the stator core between poles within a group is substantially reduced toward the centre of the group. Hence that portion of the stator core between the stator poles in a group is now less dependent on considerations of the amount of flux in it as it no longer has to serve as a path for all the flux between dissimilar groups of poles. Thus, the thickness of the stator core in this region can be reduced and even shaped and remoulded with less regard to the flux in it. The main remaining criterion lies in providing sufficient mechanical strength for the stator core. However, a slight increase in thickness of the material of the stator core will probably be required between the dissimilar groups due to the increased flux in that region.

Preferably, each group of adjacent stator poles is embraced by a single coil. Thus, the amount of material, e.g. copper, needed for the windings in a given machine will be reduced.

Preferably, the thinner portion of the stator core defines a flat outer face of the core.

Preferably, the core is made up of a plurality of laterally extending laminations. In this case when the flat outer faces are formed of the thinner portions of the core the laminations can be stamped from a strip so as to use less material to form the laminations and have less waste material left over from the stampings. In this latter regard if the thinner or flat portions are stamped adjacent one another in a line from a strip, the overall length of the strip used can also be reduced as well as leaving less scrap.

The invention also extends to a machine as described above connected to run as a motor and the same machine connected to run as a generator.

BRIEF DESCRIPTION OF THE DRAWING

The present invention can be put into practice in several ways, some of which will now be described by way of example with reference to the accompanying drawings in which.

DESCRIPTION OF THE PREFERRED EMBODIMENTS

Figure 2:
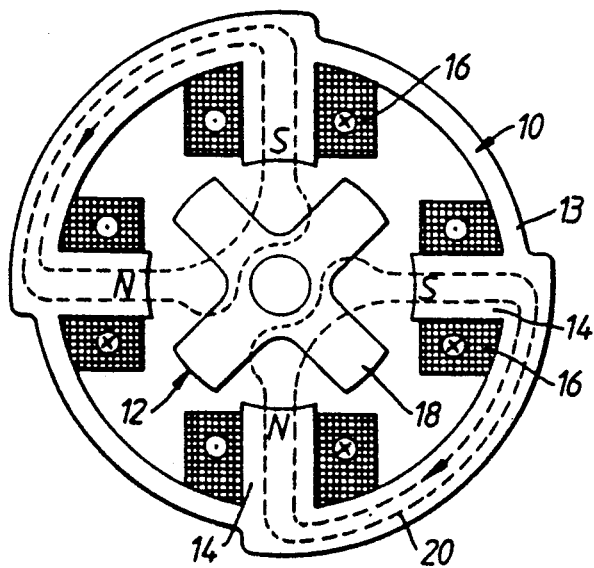
FIG. 2 is a cross section through an electric reluctance motor constructed according to the present invention.

FIG. 2 illustrates a switched salient pole single-phase reluctance motor comprising a stator 10 within which is mounted a rotor 12. A core 13 of the stator is made up of a stack of lateral metal laminations which also define four angularly equidistant stator poles 14. A copper coil 16 is wound around each of the stator poles 14. The coils are excited simultaneously.

The rotor 12 comprises a ferromagnetic steel member defining four angularly equidistant rotor poles 18.

Figure 1:
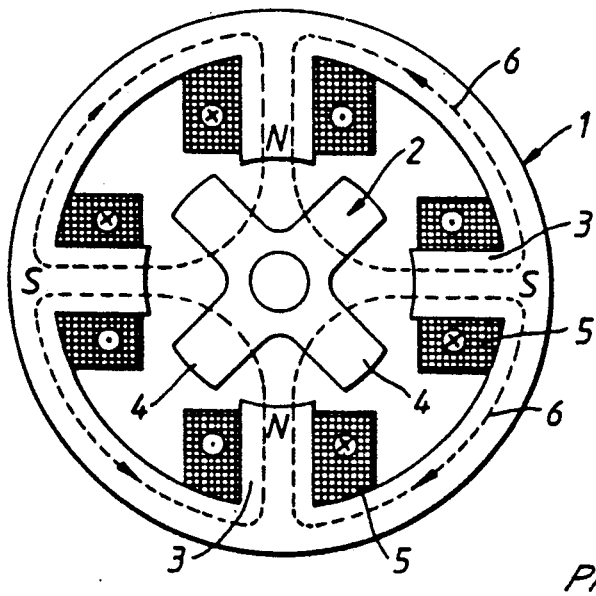
FIG. 1 is a cross-section through a prior art single-phase salient pole switched reluctance motor.

It will be apparent that this construction of switched reluctance motor is, in many respects, similar to that in FIG. 1. However, in the electric motor of FIG. 2 each of the coils 16 is connected so that the stator pole sequence is North/North/South/South (NNSS) around the core 13. By reconnecting the coils 16 in this way, the flux path is limited to that in the back of the core 13 linking adjacent dissimilar groups of pole pairs (NN and SS), as indicated by the broken lines 20. Thus, for a given excitation current in the windings, the amount of flux in this reduced path is doubled. Because of this the essentially redundant connecting portions between the similar poles is of much reduced lateral thickness. It follows that four of the lengths of coil 16 extending axially within the stator 10 are redundant as they play no part in producing the flux in the path between the dissimilar poles pairs (NN an SS) that is used to turn the rotor 12.

Figure 3:
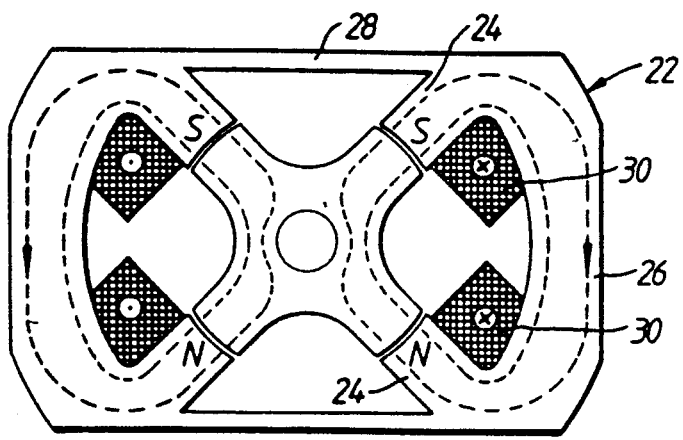
FIG. 3. is a cross section through a further electric reluctance motor according to the present invention.

FIG. 3 illustrates a modified switched double salient pole reluctance motor with one phase winding for a stack of laminations which exploits the above sequence of orientations of stator poles. In this embodiment a stator core 22, again comprising a series of lateral laminations of metal in a stack, defines four equally angularly spaced stator poles 24. Pairs of stator poles 24 are each connected by a relatively thick portion 26 of the core 22. Adjacent stator poles 24 in each similar pair are joined by a flat relatively thinner portion 28 of the core 22. Copper coils 30 in the core 22 are each wound in a loop to embrace one of the pairs of adjacent similar stator poles 24 joined by the corresponding thick portion 26.

As discussed above, by changing the windings to energise the stator poles 24 in an NNSS sequence there is no longer any flux in the sectors of the core 22 between similar poles 24. Thus, the thickness of the portions 28 is no longer dictated by the flux. Hence, their shape and size is reduced to that needed to maintain the overall mechanical strength of the core 22. This allows the thinner portions to be formed with flat outside edges. In other circumstances, the portion 28 could be formed to accommodate an adjacent component in a particularly confined space. In this case the shape would be specifically designed for the particular purpose.

However, because the amount of flux in the portions 26 is virtually doubled, it is necessary to increase their thickness over that required in an equivalent conventionally wound motor. However, overall the absence of four coil sides and of the need to carry flux between poles of like polarity leads to a significant reduction in the dimensions of each lamination.

As mentioned above the laminations for an electric motor are stamped from a strip of metal. By forming this embodiment of the present invention with flat sides due to the absence of flux in roughly half the core, each lamination can be stamped with considerably less waste material in between it and an adjacent stamping than would be the case in a conventional circular stamping. Thus the amount, and therefore cost, of steel strip required for a given number of laminations is considerably reduced.

The effect of constructing each coil to embrace a pair of adjacent poles means that four lengths of coil running the length of a conventional salient pole electric motor are eliminated with little or no diminution in performance. This leads to a consequent reduction in the amount of copper required for the windings as a whole to roughly half that which runs along the length of the motor in addition to a slightly increased amount at the end of each winding. Such an overall reduction in the amount of copper used in the windings will lead to a drop in the winding resistance, as well as a cheaper and lighter core.

The performance of the motor can be further improved by adjusting the proportions of the copper and iron core sections to take account of the new winding strategy. For instance, if the two coils now used each have the same number of turns as each of the original four coils connected in series in an equivalent known reluctance motor, the EMF per coil will be doubled in the present embodiment as each coil now embraces two stator poles. Neglecting, for the moment, the end windings, the removal of the four redundant coil sides will halve the resistance of the winding and hence the copper loss and weight of the copper used. However, the amount of copper required for the end windings will need to be somewhat greater than in the previously known equivalent motor to embrace both poles. Clearly, the benefit from the reduction in the amount of copper and the improved efficiency will increase with an increasing length to width ratio of the motor.

It will be apparent to those skilled in the art that FIGS. 2 and 3 represent only two applications of the present invention which serve to illustrate the benefits of the new motor construction. Clearly there are many possible variations in the detailed design of the motor lamination according to the basic principles embodied in FIG. 3. For example, pole arcs, air gap diameter relative to overall dimensions, coil layouts and the relative thickness of various parts of the lamination can be changed in particular designs. However, all will benefit from a reduced copper content and a reduction in the amount of lamination material required.

Furthermore, the invention could also be applied to motors with increased numbers of poles. For example, the invention could be utilised in an 8/8 pole motor in which 2 coils embrace 4 poles or, alternatively, in which 4 coils each embrace 2 poles.

Although it is more usual for the excited member to be the stator, it is, of course, possible for the rotor to be the excited member instead.

As well as switched reluctance motors, the invention is also applicable to some forms of stepping motor and synchronous reluctance motor which have salient poles on both stator and rotor. While the invention has been described in relation to a single phase motor, in which the number of rotor and stator poles is usually the same, the invention is equally applicable to combinations of rotor and stator poles in single and multi-phase applications, for example, incorporating multiple stacks of laminations incorporated in a single motor such as a stepping motor. In this case, many combinations of rotor and stator poles are possible.

In an alternative embodiment the thinner portions are dispensed with entirely. The remaining portions of the core maintaining the flux path are mounted in a supporting frame or housing which may or may not be a constituent part of the motor.

The single-phase machines described can each be used as a single item or as one stack of a multiphase machine.

I claim:

1. A salient pole single phase electric reluctance machine comprising:
   a primary having a primary core defining primary poles;
   a secondary having a secondary core defining secondary poles; and
   a set of coils, each of said coils embracing a group of adjacent ones of said primary poles, said set of coils being simultaneously energizable so that the magnetic orientation of those poles in said group of adjacent ones of said primary poles embraced by a given coil is the same and the magnetic orientation of adjacent groups of primary poles is different, thereby establishing regions in said primary core of substantially no flux, said regions of substantially no flux being between adjacent similarly oriented poles in said group, at least a portion of said primary core that includes said regions of substantially no flux being relatively radially thinner than regions of said primary core that are between said group of adjacent ones of said primary poles embraced by a given coil and said adjacent groups of primary poles.

2. A machine as claimed in claim 1, wherein said primary core is angularly continuous.

3. A machine as claimed in claim 1, wherein said thinner portion of said primary core defines a substantially flat outer face of said core.

4. A machine as claimed in claim 1, wherein said primary core is a stator and said secondary core is a rotor.

5. A machine as claimed in claim 1, wherein said primary core is made up of a plurality of laterally extending laminations.

* * * * *